(12) United States Patent
Nuculaj

(10) Patent No.: US 9,375,064 B1
(45) Date of Patent: Jun. 28, 2016

(54) PORTABLE FULL-LENGTH MIRROR

(71) Applicant: Lize Nuculaj, Westland, MI (US)

(72) Inventor: Lize Nuculaj, Westland, MI (US)

( * ) Notice: Subject to any disclaimer, the term of this patent is extended or adjusted under 35 U.S.C. 154(b) by 0 days.

(21) Appl. No.: 14/746,931

(22) Filed: Jun. 23, 2015

(51) Int. Cl.
| | |
|---|---|
| *A45C 7/00* | (2006.01) |
| *A45C 9/00* | (2006.01) |
| *A45C 5/14* | (2006.01) |
| *A45C 13/00* | (2006.01) |
| *A45C 13/02* | (2006.01) |
| *A45C 13/10* | (2006.01) |
| *A45C 13/26* | (2006.01) |
| *B62B 1/12* | (2006.01) |

(52) U.S. Cl.
CPC . *A45C 9/00* (2013.01); *A45C 5/146* (2013.01); *A45C 7/0054* (2013.01); *A45C 13/005* (2013.01); *A45C 13/02* (2013.01); *A45C 13/10* (2013.01); *A45C 13/262* (2013.01); *B62B 1/125* (2013.01); *A45C 2007/0004* (2013.01); *A45C 2013/267* (2013.01); *A45C 2200/15* (2013.01)

(58) Field of Classification Search
CPC .... A45C 7/0054; A45C 9/00; A45C 2200/15; A45C 2007/0004; A45C 2007/0009; A45C 2007/0013; A45C 5/146
See application file for complete search history.

(56) References Cited

U.S. PATENT DOCUMENTS

| | | | | |
|---|---|---|---|---|
| 1,121,785 A | * | 12/1914 | Ballard | G02B 5/10 359/851 |
| 1,957,847 A | * | 5/1934 | Peters | A47G 1/02 160/133 |
| 2,124,146 A | * | 7/1938 | Genevieve Miller | A45D 42/00 359/851 |
| 2,389,788 A | * | 11/1945 | Lathrop | A45C 11/008 132/312 |
| 2,461,421 A | * | 2/1949 | Winifred | A45C 13/02 132/316 |
| 4,146,308 A | * | 3/1979 | Cohen | G02B 7/182 248/472 |
| 4,397,526 A | * | 8/1983 | Van Deursen | G02B 7/182 248/472 |
| 5,270,871 A | * | 12/1993 | Florian | A63B 24/0003 248/469 |
| 5,813,503 A | * | 9/1998 | Chang | A45C 5/146 190/115 |
| 7,347,573 B1 | * | 3/2008 | Isler | A45D 42/10 359/854 |
| 8,651,676 B2 | * | 2/2014 | Nottage | A45D 42/18 359/855 |
| 2004/0008434 A1 | * | 1/2004 | Yang | G02B 7/182 359/872 |

* cited by examiner

*Primary Examiner* — Jeffrey J Restifo
*Assistant Examiner* — Erez Gurari
(74) *Attorney, Agent, or Firm* — George L. Boller

(57) ABSTRACT

Multiple mirror panels are stowed for transport within an interior of a transport case and at a point of use are mounted on a support structure which is erected on the transport case to form a partial or complete full-length mirror at the point of use.

21 Claims, 4 Drawing Sheets

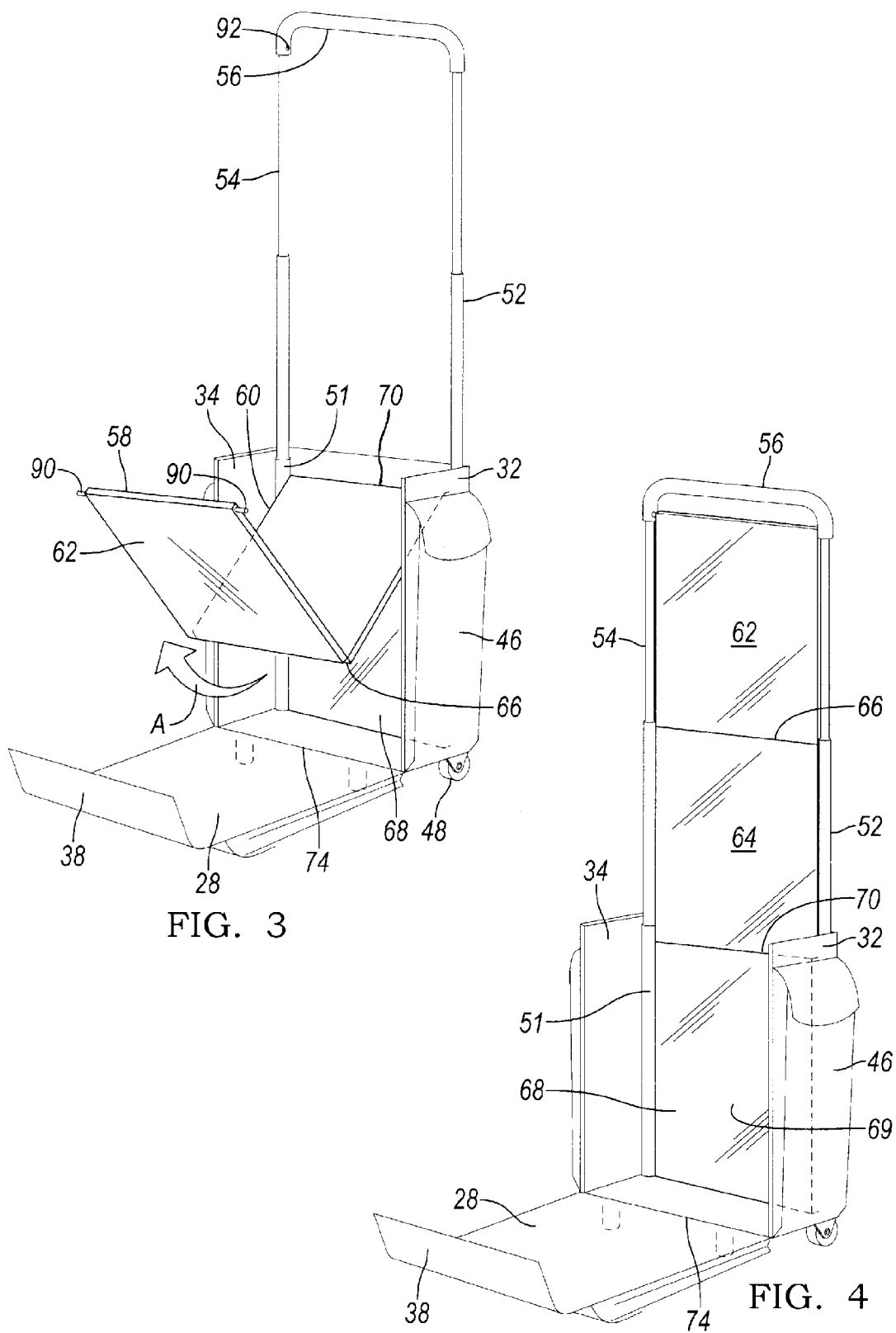

PORTABLE FULL-LENGTH MIRROR

TECHNICAL FIELD

This invention relates to a mirror having mirror panels which are stowed within a transport case for transport and which are removed and mounted on a support structure on the transport case at a point of use to form a partial or complete full-length mirror.

BACKGROUND

A complete or partial full-length mirror is useful in various situations for enabling a person to view his/her personal appearance such as attire, hairstyling, etc. Such a mirror however is inconvenient to transport due to various factors, such as size, weight, and fragility.

SUMMARY OF THE INVENTION

Briefly, this disclosure introduces a mirror comprising multiple mirror panels which are stowed for transport within a transport case which has an erectable mirror support structure. When the transport case is opened at a point of use, the mirror support structure is erected, and the mirror panels are removed and mounted on the erected mirror support structure to form a partial or complete full-length mirror.

The transport case has an interior bounded by a bottom, four sides extending upward from the bottom to an open top, and a cover for selectively opening and closing the open top. Two of the sides are front and back sides and the other two sides are right and left sides. Distance between the front side and the back side defines depth of the transport case. Distance between the right side and the left side defines width of the transport case. Distance between the bottom and the cover defines height (or length) of the transport case.

At least two mirror panels are disposed in a stowed position within the interior of the transport case. Each panel has a back face and a mirrored front face.

The mirror support structure is upwardly erectable on the transport case from a stowed position to an erected position.

When the open top is uncovered and the support structure is placed in erected position, a first and a second of the mirror panels are moved, from their stowed position, through the open top to a mounted position, one panel above another panel, on the support structure with the panels' mirrored front faces facing in the same direction.

The foregoing summary, accompanied by further detail of the disclosure, will be presented in the Detailed Description below with reference to the following drawings that are part of this disclosure.

BRIEF DESCRIPTION OF THE DRAWINGS

FIG. 3 is a third perspective view of the first embodiment.

FIG. 4 is a fourth perspective view of the first embodiment.

DETAILED DESCRIPTION

Figure 1:
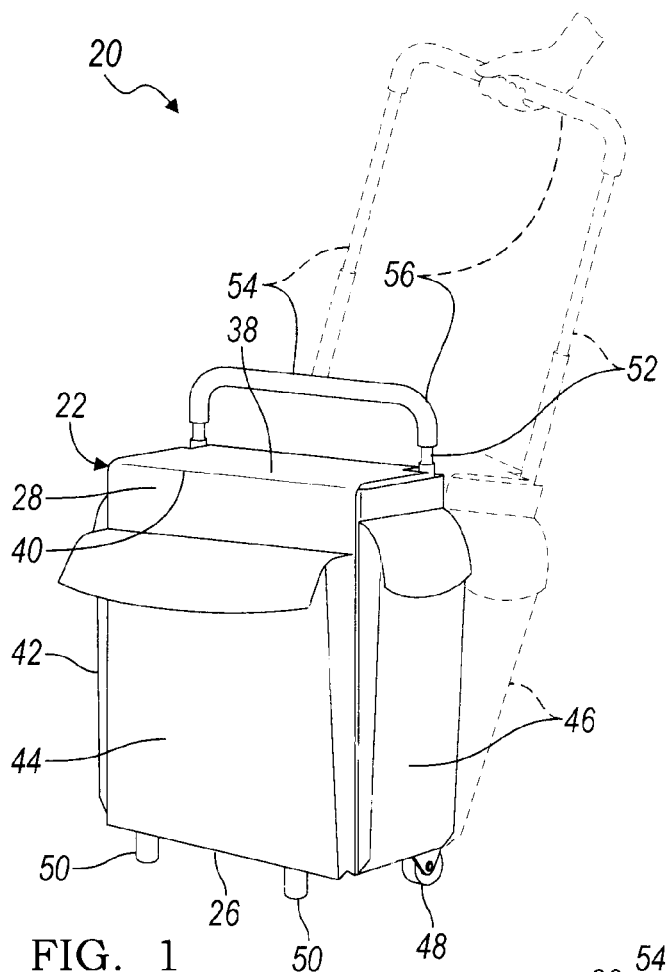
FIG. 1 is a first perspective view of an example of a first embodiment.

FIGS. 1-4 show a first embodiment 20 comprising a transport case 22 having an interior 24 bounded by a bottom 26, a front side 28, a back side 30, a right side 32, and a left side 34, those four sides extending upward from bottom 26 to an open top 36. A cover 38 selectively opens and closes open top 36. Interior 24 is enclosed by bottom 26, by the four sides 28, 30, 32, 34, and by cover 38 when the latter is closing open top 36. As shown, each of the bottom, the sides, and the cover has a generally rectangular shape.

Figure 2:
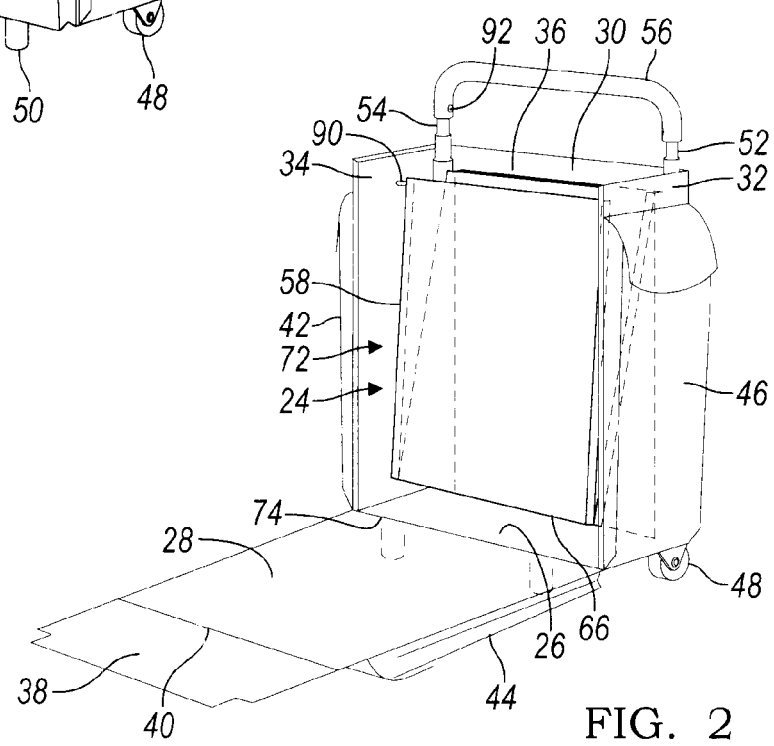
FIG. 2 is a second perspective view of the first embodiment.

FIG. 1 shows cover 38 closing open top 36 while FIGS. 2-4 show open top 36 uncovered. Cover 38 can be completely separable from transport case 22 or it can, as shown, have a hinge or folding connection 40 with the top margin of front side 28 allowing the cover to be swung open.

On its exterior, transport case 22 comprises storage pockets 42, 44, 46 as shown. At two back corners of bottom 26, transport case 22 is supported on wheels 48, only one of which can be seen in the Figs. At the front of bottom 26, transport case 22 is supported by two short posts 50. Wheels 48 and posts 50 enable bottom 26 to be horizontally supported a short distance above an underlying flat surface when transport case 22 is at rest on the underlying surface.

Two poles spaced apart widthwise of transport case 22, specifically a right pole 52 and a left pole 54, are upwardly extendable on transport case 22 from a stowed position shown in solid lines in FIG. 1 and also in FIG. 2 to a partially extended towing position shown in broken lines in FIG. 1 and to a fully extended erected position shown in solid lines in FIGS. 3 and 4. A bar 56 extends between upper ends of the two poles. Bar 56 provides a handgrip, as suggested in FIG. 1, which can be grasped by a person's hand to tilt transport case 22 to a position, illustrated in broken lines of FIG. 1, which lifts posts 50 off an underlying surface and allows the person to roll transport case 22 on wheels 48 along the underlying surface by pulling bar 56 with a component of force parallel with the underlying surface. Depending on the specific height of transport case 22, each pole may have a fixed length which is extendable from a pole receptacle 51 on the transport case. Alternately, a pole may have telescoping sections, as shown.

At least two panels, specifically a first panel 58 and a second panel 60, are disposed in a stowed position within interior 24. Each panel 58, 60 has a back face and a mirrored front face 62, 64.

In addition to providing a pull for towing transport case 22 on wheels 48, poles 52, 54, and bar 56 provide a mirror support structure which is upwardly erectable on transport case 22 from stowed position shown in FIGS. 1 and 2 to erected position shown in FIGS. 3 and 4.

When transport case 22 has been opened and the mirror support structure provided by poles 52, 54, and bar 56 has been erected, first panel 58 and second panel 60 are moved from their stowed position to a mounted position on the support structure, one panel 58 above the other panel 60, with their mirrored front faces 62, 64 facing in the same direction.

A hinge joint 66 connects first panel 58 with second panel 60 for swinging first panel 58 relative to second panel 60 about an imaginary axis which parallels the width of transport case 22 as suggested by arrow A in FIG. 3. In stowed position of first panel 58 and second panel 60 as shown in FIG. 2, their respective back faces are disposed in mutual confrontation.

A third panel 68 is fixedly mounted upright on bottom 26 within interior 24. A hinge joint 70 connects second panel 60 with third panel 68 for swinging second panel 60 relative to third panel 68 about an imaginary axis which parallels the width of transport case 22.

In stowed position of first panel 58 and second panel 60, the mirrored front face 64 of second panel 60 and a front face of third panel 68 are disposed in mutual confrontation. The front face of third panel 68 comprises a mirrored front face 69 in the embodiment of FIGS. 1-4. The depth of transport case 22 defines an interior storage space 72 whose depth is greater than that of the stowed panels and which provides storage space in front of the stowed panels.

At a point of use, transport case 22 is opened by uncovering open top 36, and swinging front side 28 down about a hinge or fold joint 74 as seen in FIGS. 2-4. First panel 58 is grasped and lifted upward and forward as suggested by arrow A in FIG. 3, swinging second panel 60 on third panel 68 about hinge joint 70 as movement of first panel 58 pulls second panel 60 along with it. When first panel 58 is finally placed in position on the erected mirror support structure, second panel 60 is thereby placed immediately below first panel 58 and above third panel 68. The succession of three mirrored panels with mirrored faces facing in the same direction provides a complete full-length mirror whose height is greater than its width. Detail of the attachment of the mirrored panels to the mirror support structure will be explained later with reference to other Figs.

At least one side of transport case 22 has an association with adjacent sides to enable the at least one side to be moved onto a portion of a surface on which the transport case is supported adjacent a portion of that surface which directly underlies bottom 26. FIG. 2 shows front side 28 being disconnectable from right and left sides 32, 34 and connected with bottom 26 by the hinge joint 74 which allows it to be swung downward and forward onto an underlying surface, thereby providing greater stability for the erected support structure and the mounted panels 58, 60.

Figure 5:
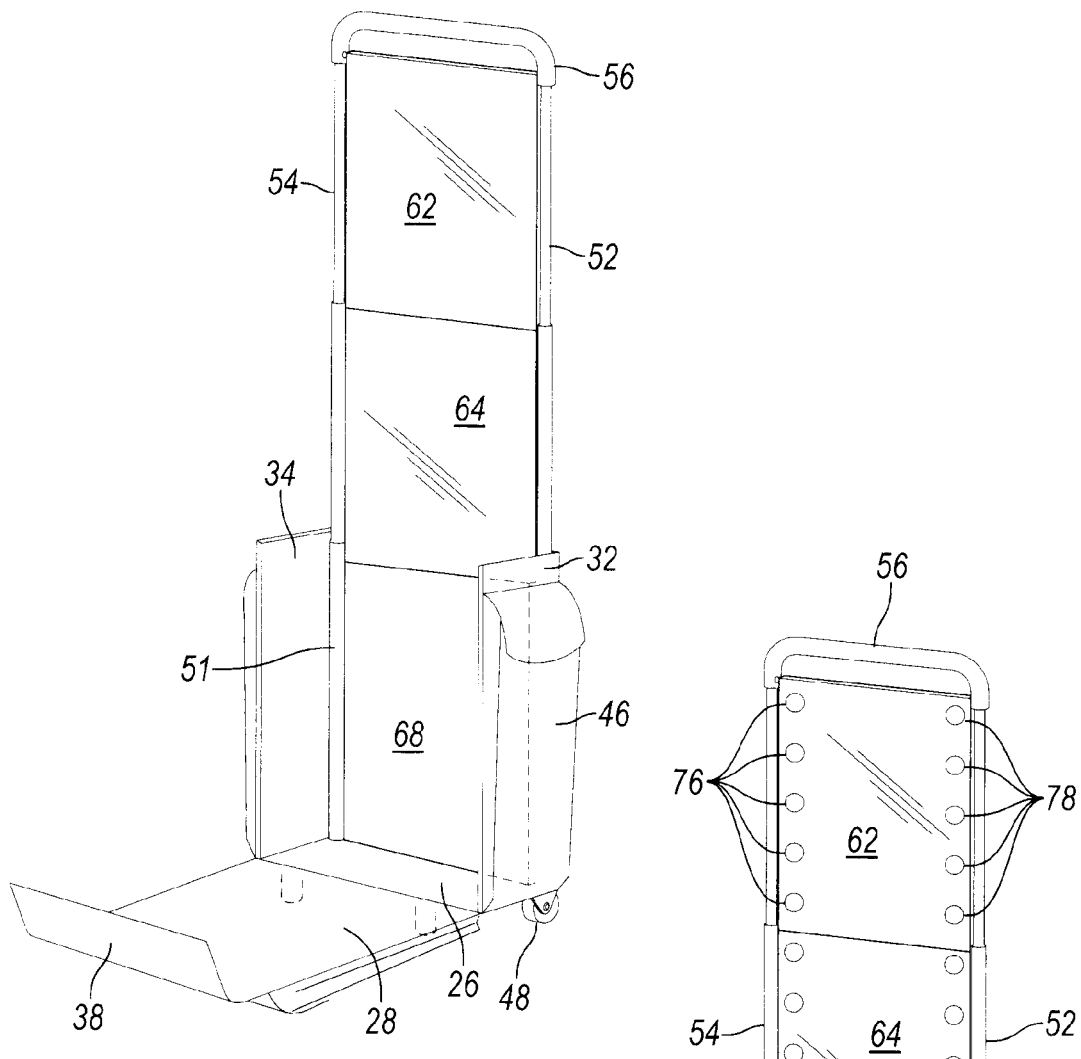
FIG. 5 is a view similar to FIG. 4 showing a second embodiment.

The embodiment shown in FIG. 5 is like the one shown in FIGS. 1-4 except that the front face of third panel 68 is not mirrored. FIG. 5 is an example of a partial full-length mirror.

Figure 6:
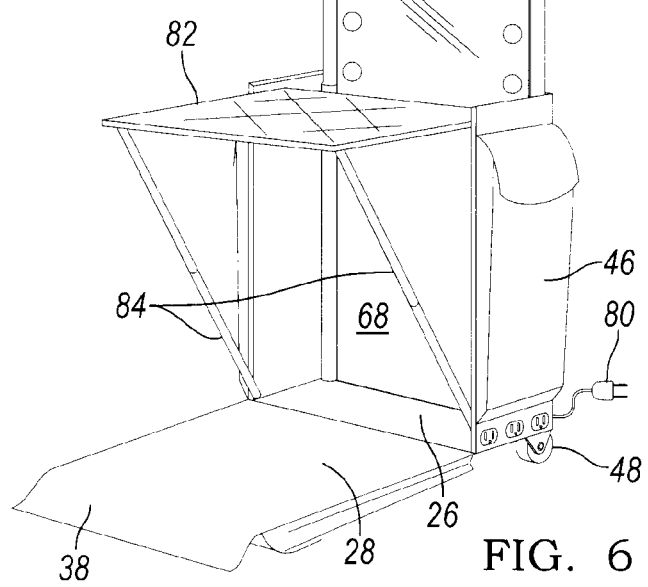
FIG. 6 is a view similar to FIG. 5 showing a third embodiment.

The embodiment shown in FIG. 6 is like the one shown in FIG. 5 and further includes two vertical rows of lamps 76, 78 along the sides of panels 58, 60 for illuminating space frontally of the panels. An electric power cord 80 enables the lamps to connect to an electric receptacle (not shown in the Fig.) at a point of use. If the lamps are of the incandescent type, they may be covered by a heat shield or transparent lens to prevent them from being directly touched.

FIG. 6 includes a table 82 which has been placed in a horizontal position frontally of panels 58, 60 at approximately the level of open top 36 after the panels have been mounted on the erected support structure and front side 28 has been swung down onto an underlying surface. Table 82 is at least partially supported by transport case 22, and in the embodiment shown is completely supported. Table 82 is stowed in storage space 72 in front of the mirrored panels for transport. At a point of use it is moved to a position in which its side margins are supported on ledges on the inside of sides 32, 34 Two struts 84 extend from bottom 26 to support the front of the table on the transport case. The struts could be replaced by legs which rest on front side 28 or on the underlying surface One type of attachment for attaching panels 58, 60 to the erected support structure is shown in FIGS. 1-6. Other types are shown in FIGS. 7-9.

Figure 7:
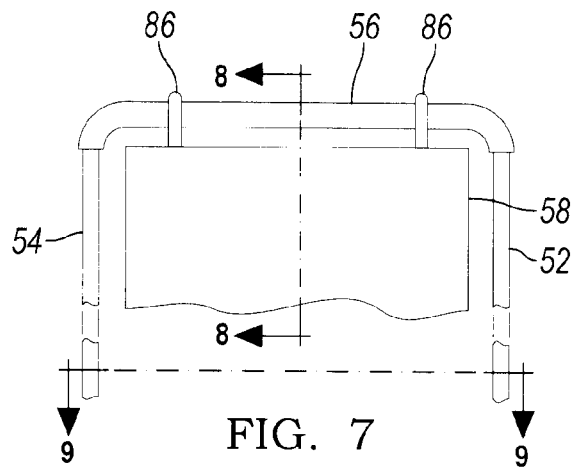
FIG. 7 is a fragmentary view showing certain detail intentionally omitted from the prior Figs. for better clarity of those prior Figs.
Figure 8:
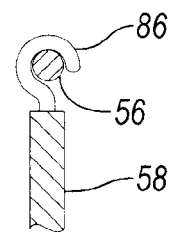
FIG. 8 is an enlarged cross section view in the direction of arrows 8-8 in FIG. 7.
Figure 9:
FIG. 9 is an enlarged cross section view in the direction of arrows 9-9 in FIG. 7 to show a modification.

In FIGS. 7-9, first panel 58 comprises an attachment attaching it to bar 56. The attachment example shown in FIGS. 7 and 8 comprises hooks 86 which hook over bar 56 for hanging first panel 58 by gravity from the bar with second panel 60 hanging from first panel 58.

FIG. 9 shows a different attachment example, specifically open-throated spring clasps 88 which snap onto and off of portions of the mirror support structure. Either or both panels 58, 60 may have these spring clasps, and the spring clasps may be located to attach to bar 56 and/or poles 54, 56. FIG. 9 shows the clasps attaching to the poles with the mirrored panels being wider than in FIG. 7.

Figure 10:
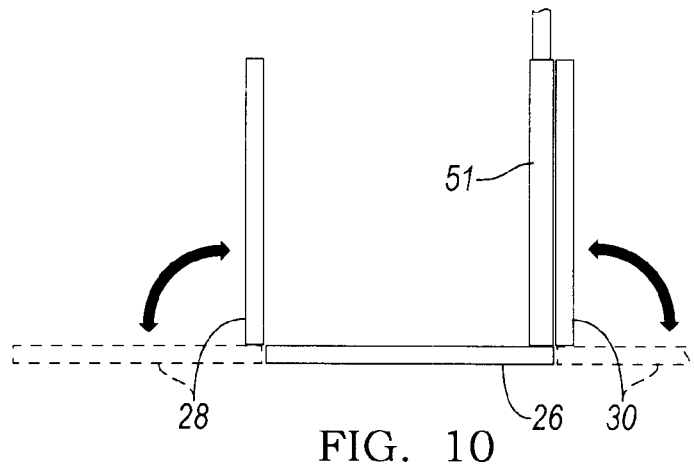
FIG. 10 is a diagrammatic partial side elevation view of FIG. 5.

The attachment example shown in FIGS. 1-6 comprises spring-loaded retractable pins 90 at the sides of the top of first mirror panel 58. With the mirror support structure having been erected as in FIG. 3, pins 90 can be pushed in (i.e. retracted) against the spring force and when aligned with holes 92 in bar 56, the spring loaded pins will extend and insert themselves into holes 92. A catch on the exterior of each pin allows it to be pulled out of the hole so that the mirror panel can be returned to storage FIG. 10 shows a modification where both front side 28 and back side 30 can be swung down to provide even greater stability than that provided by front side 28 alone. Left to right stability can be increased if right side 32 and left side 34 are connected to bottom 26 by hinge or fold joints for being swung down and outwardly from bottom 26 to rest on the underlying support surface.

Figure 11:
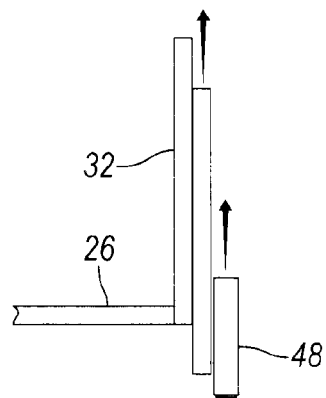
FIG. 11 is a fragmentary diagrammatic view showing a modification.

FIG. 11 shows a modification in which wheels 48 are upwardly retractable on transport case 22 for enabling the back of bottom 26 to rest directly on an underlying surface. If posts 50 are also retractable, bottom 26 can lie flat on an underlying surface free of support by wheels 48 and posts 50.

The preferred mirrored panels are thin, light-weight, shatterproof glassless mirrors which have an optical image quality which is bright, clear, and free of distortion equivalent to the quality of a silvered glass mirror.

Although not specifically illustrated by a separate drawing Fig., another embodiment comprises the first mirrored panel being attached to a first pair of telescoping sections of the right and left poles so as to move up and down with motion of that pair of telescoping sections. The second mirrored panel is attached to a second pair of telescoping sections of the right and left poles so as to move up and down with motion of the second pair of telescoping sections. With the panels inside the transport case and the transport case open, pulling bar 56 pulls the first pair of telescoping sections upward, pulling the first panel out of the transport case. At an upward limit of telescopic travel of the first pair of sections on the second pair of sections, continued pulling of bar 56 now pulls the second pair of telescoping sections upward, pulling the second panel upward.

In any of the disclosed embodiments, elements of the poles are provided with locking mechanisms with are engaged to keep the pole elements in extended position suitable for towing of the storage case and in extended position suitable for supporting the mirror panels at point of erection of the mirror support structure and which are disengaged to allow extended pole elements to be returned to stowed position.

What is claimed is:

1. An article of manufacture comprising:
   a transport case having an interior bounded by a bottom, sides extending upward from the bottom to an open top, and a cover for selectively opening and closing at least the open top;
   at least two panels disposed in a stowed position within the interior, each panel having a back face and a mirrored front face;
   a mirror support structure which is mounted on the transport case and is upwardly erectable on the transport case from a stowed position to an erected position;
   when the cover is opening at least the open top and the support structure is in erected position, a first and a second of the panels being movable from their stowed position to a mounted position on the support structure, one panel above another panel, with their mirrored front faces facing in the same direction.

2. An article of manufacture as set forth in claim 1 further comprising wheels for rolling the transport case along an underlying surface.

3. An article of manufacture as set forth in claim 2 in which the wheels are retractable on the transport case for enabling the bottom to lie flat on an underlying surface without underlying support by the wheels.

4. An article of manufacture as set forth in claim 2 in which the support structure comprises a handgrip which is exterior to the interior of the transport case and which, when grasped by a person's hand and pulled with a component of force parallel to an underlying surface, rolls the transport case on the wheels along the underlying surface.

5. An article of manufacture as set forth in claim 4 in which the transport case has a height, a width, and a depth, and the support structure comprises two poles which are upwardly extendable in length from stowed position of the support structure to erected position of the support structure and which are spaced apart widthwise of the transport case, and the handgrip comprises a grip bar extending between upper ends of the two poles.

6. An article of manufacture as set forth in claim 5 in which a joint connects the first panel with the second panel for swinging the first panel relative to the second panel about an imaginary axis which runs widthwise of the transport case.

7. An article of manufacture as set forth in claim 6 in which stowed position of the first panel and the second panel comprises their respective back faces being disposed in mutual confrontation.

8. An article of manufacture as set forth in claim 7 further comprising a third panel fixedly mounted on the transport case within the interior and further including a joint which connects the second panel with the third panel for swinging the second panel relative to the third panel about an imaginary axis which runs widthwise of the transport case.

9. An article of manufacture as set forth in claim 8 in which stowed position of the first panel and the second panel further comprises the mirrored front face of the second panel and a front face of the third panel being disposed in mutual confrontation.

10. An article of manufacture as set forth in claim 9 in which the front face of the third panel comprises a mirrored front face.

11. An article of manufacture as set forth in claim 9 in which depth of the transport case defines a storage space whose depth is greater than that of the stowed panels.

12. An article of manufacture as set forth in claim 1 in which at least one side of the transport case is movably mounted on the transport case for movement onto a portion of a surface on which the transport case is supported adjacent a portion of the surface which underlies the bottom of the transport case.

13. An article of manufacture as set forth in claim 1 in which at least one of the first and second panels comprises an attachment separably attaching at least one of the panels to the support structure in mounted position of the panels.

14. An article of manufacture as set forth in claim 13 in which the transport case has a height, a width, and a depth, and the first panel comprises an attachment attaching the first panel to a bar of the support structure which has length running widthwise of the transport case.

15. An article of manufacture as set forth in claim 14 in which the attachment attaching the first panel to the bar comprises a hook which hooks over the bar for hanging the first panel by gravity from the bar with the second panel hanging from the first panel.

16. An article of manufacture as set forth in claim 13 in which the attachment comprises an open-throated spring clasp separably attaching to the support structure.

17. An article of manufacture as set forth in claim 1 in which at least one of the panels comprises at least one lamp for illuminating space frontally of the panels.

18. An article of manufacture as set forth in claim 1 including a table which is stowed within the interior of the transport case and can be moved to a horizontal position frontally of the panels and be at least partially supported by the transport case when the panels are in mounted position and a movable side of the transport case is resting onto a portion of an underlying surface adjacent a surface which underlies the bottom of the transport case.

19. An article of manufacture as set forth in claim 1 in which the transport case comprises at least one storage compartment exterior of the interior.

20. An article of manufacture which comprises:
   a transport case having an interior bounded by a bottom, sides extending upward from the bottom to an open top, and a cover for selectively opening and closing at least the open top;
   a mirror support structure mounted upright on the transport case;
   at least two mirror panels mounted on the support structure, a first mirror panel above a second mirror panel, while the cover is opening at least the open top, the at least two mirror panels having mirrored faces facing in the same direction with the first panel and at least a portion of the second panel being disposed above the open top of the transport case.

21. An article of manufacture as set forth in claim 20 in which at least one of the mirror panels is mounted on the mirror support structure by an attachment which separably attaches at least one of the mirror panels to the support structure.

* * * * *